United States Patent
Vondran, Jr.

(10) Patent No.: US 6,480,938 B2
(45) Date of Patent: Nov. 12, 2002

(54) EFFICIENT I-CACHE STRUCTURE TO SUPPORT INSTRUCTIONS CROSSING LINE BOUNDARIES

(75) Inventor: Gary L Vondran, Jr., Winchester, MA (US)

(73) Assignee: Hewlett-Packard Company, Palo Alto, CA (US)

(*) Notice: Subject to any disclaimer, the term of this patent is extended or adjusted under 35 U.S.C. 154(b) by 165 days.

(21) Appl. No.: 09/738,690

(22) Filed: Dec. 15, 2000

(65) Prior Publication Data

US 2002/0116567 A1 Aug. 22, 2002

(51) Int. Cl.[7] ............................................. G06F 12/00
(52) U.S. Cl. ................................. 711/125; 711/4; 711/5
(58) Field of Search .................................. 711/125, 4, 5

(56) References Cited

U.S. PATENT DOCUMENTS 6,256,709 B1 * 7/2001 Patel et al. .................. 711/128
6,351,796 B1 * 2/2002 McCormick, Jr. et al. .. 711/204
6,418,530 B2 * 7/2002 Hsu et al. .................... 711/237

OTHER PUBLICATIONS

Lowney, Geoffrey P., et al. "The Multiflow Trace Scheduling Compiler" The Journal of Supercomputing; 7 (1993); pp 51–142.

Wolfe, Andrew, et al. "Executing Compressed Programs on An Embedded RISC Architecture" Proceedings of 25th Annual International Symposium on Microachitecture, Dec. 1992. pp 1–19.

Beck, Gary R., et al. "The Cydra 5 Minisupercomputer: Architecture and Implementation." The Journal of Supercomputing, 7 (1993); pp 143–180.

Rau, B. Ramakrishna, et al. "The Cydra 5 Departmental Supercomputer: Design Philosophies, Decisions and Trade-offs." IEEE 1989 0073–1129/89/0000/0202: pp 202–213.

Conte, Thomas M., et al. "Instruction Fetch Mechanisms for VLIW Architectures with Compressed Encodings." IEEE 1996 1072–4451/96; pp 201–211.

Gwennap, Lindley. "Intel's P6 Uses Decoupled Superscalar Design." Microprocessor Report, Feb. 16, 1995; pp 9–15.

Christie, Dave. "Developing the AMD–K5 Architecture." IEEE Micro 1996 0272–1732/96; pp 16–26.

Banerjia, Sanjeev, et al. "NextPC Computation for a Banked Instruction Cache for a VLIW Architecture With a Compressed Encoding". Department of Electrical and Computer Engineering, North Carolina State University, pp 1–10.

* cited by examiner

Primary Examiner—Jack A. Lane

(57) ABSTRACT

A cache structure, organized in terms of cache lines, for use with variable length bundles of instructions (syllables), comprising: a first cache bank that is organized in columns and rows; a second cache bank that is organized in columns and rows; logic for defining said cache line into a sequence of equal sized segments, and mapping alternate segments in said sequence of segments to the columns in said cache banks such that said first bank holds even segments and said second bank holds odd segments; logic for storing bundles across at most a first column in said first cache bank and a sequentially adjacent column in said second cache bank; and logic for accessing bundles stored in the first and second cache banks.

23 Claims, 10 Drawing Sheets

EFFICIENT I-CACHE STRUCTURE TO SUPPORT INSTRUCTIONS CROSSING LINE BOUNDARIES

FIELD OF THE INVENTION

Briefly, the present invention relates generally to the field of cache structures, and more particularly, to cache structures for use with variable length instructions that may cross cache line boundaries.

BACKGROUND OF THE INVENTION

Variable length instructions occur not only for CISC processors, but also in very long instruction word (VLIW) architectures with NOP (non-operational instruction) compression. In particular, it is noted that VLIW bundles of instructions must explicitly schedule NOP operations in unused issue slots. In order to reduce code size and better utilize the instruction cache, these NOP's are compressed out. This operation results in variable length instruction bundles. With variable length bundles, some of the bundles may cross cache line boundaries. The processing necessary to handle bundles that cross cache line boundaries adversely affects die area and cycle time.

A straightforward approach to processing instruction bundles that cross cache line boundaries is to cache the bundles in an uncompressed form. This caching can be implemented by uncompressing the bundles as they are loaded into the cache on a miss. See Lowney, P. Freudenberger, S. Karzes, T. Lichtenstein, W. Nix, R. O'Donell, J., Ruttenberg, J., "The Multiflow Trace Scheduling Compiler", *Journal of Supercomputing*, January 1993, pages 51–142; Wolfe, A. and Chanin, A., "Executing Compressed Programs on An Embedded RISC Architecture", *International Symposium on Microarchitecture*, December 1992, pages 81–91. Because the uncompressed bundles will be fixed in size, the cache line size can be chosen such that the bundles will never straddle cache line boundaries. This, however, results in reduced cache performance due to NOP instructions occupying cache slots. A second issue with this approach is the mapping of the uncompressed bundles into the cache. Because uncompressed and compressed bundles have different sizes, a mechanism is needed to translate between the PC (program counter) and the main memory addresses.

A second approach to the problem of bundles crossing cache line boundaries is to restrict the bundles to a limited set of sizes. See Beck, G., Yen, D., Anderson, T., "The Cydra 5 Mini Supercomputer: Architecture and Implementation," *Journal of Supercomputing*, January 1993, pages 143–180; Rau, B., Yen, D., Yen, W., and Towle, R., "The Cydra 5 Departmental Supercomputer: Design Philosophies, Decisions and Trade-offs", *Computer*, January 1989, pages 12–35. Bundles that fall between the allowed sizes are NOP padded to the next size up. Bundles within a cache line are restricted to be either all the same size or a limited combination of sizes. The advantage of this approach is that it is relatively simple. The disadvantage of the approach is that it limits the amount of NOP compression, both in main memory and in the cache. This results in both a larger code size and a reduction of cache performance.

Another common approach to the problem is to not allow variable length bundles to cross cache line boundaries. Bundles that cross cache line boundaries are either moved to the next line with NOP padding (see Conte, T., Banerjia, S., Larin, S., Menezes, K., and Sathaye, S., "Instruction Fetch Mechanisms for VLIW Architecture with Compressed Encodings," *Symposium on Microarchitecture*, December 1996, pages 201–211). This design results in a reduction in code compression in both memory and cache.

A fourth approach to the crossing of cache line boundaries is to use a banked cache structure. Typically, banked caches are implemented by splitting the cache into two physical pieces, one for the even cache lines and the other for the odd cache lines. See Banerjia, S., Menezes, K., and Conte, T., "Next P.C. computation for a Banked Instruction Cache for a VLIW Architecture with a Compressed Encoding", Technical Report, Department of Electrical and Computer Engineering, North Carolina State University, Raleigh, N.C. 27695–7911, June 1996; and the Conte et al. reference noted earlier. By using this approach, adjacent cache lines can always be accessed simultaneously. A banked instruction cache is implemented in the AMD K5 processor. See Christie, D., "Developing the AMD-K 5 Architecture", IEEE Micro, April 1996, pages 16–26. The disadvantage to this banked approach is that data is distributed between the two banks on a cache line basis. Since cache lines are long and bundles can start at any location within either bank's line, bus routing and multiplexing are costly. For example, a bank cache structure with 32 syllable lines has 64 possible bundle starting positions (32 in each bank). A four issue, 32-bit per syllable machine with this line length would require a 128-bit 64-to-1 multiplexer to index the desired bundle. This is costly both in terms of die area and cycle time. In addition, the implementation typically places an incrementor on the critical timing path between the PC and the cache. Because of these points, banked caches have been used only sparingly.

A proposal by STMicroelectronics, is to use a single bank cache, latching the current sub-line until all syllables within the sub-line have been used. This frees the instruction cache to fetch the next sub-line if needed to complete the bundle. Intel uses a similar approach in their Pentium Pro Processor. See Gwennap, L., "Intel's P6 User Decoupled Superscalar Design", *Microprocessor Report*, February 1995, pages 9–15. This single bank cache approach works well for the execution of sequential code segments, effectively mimicking a two bank cache. However, branches to bundles that straddle sub-lines result in a stall due to two sub-lines being needed. Because branches occur frequently and the probability that the target will straddle line boundary is great, the degradation in performance is significant.

SUMMARY OF THE INVENTION

Briefly, in one aspect the present invention comprises a cache structure, organized in terms of cache lines, for use with variable length bundles of instructions (syllables), including: a first cache bank that is organized in columns and rows; a second cache bank that is organized in columns and rows; logic for defining the cache line into a sequence of equal sized segments, and mapping alternate segments in the sequence of segments to the columns in the cache banks such that the first bank holds even segments and the second bank holds odd segments; logic for storing bundles across at most a first column in the first cache bank and a sequentially adjacent column in the second cache bank; and logic for accessing bundles stored in the first and second cache banks.

In a further aspect of the present invention, each of the segments is at least the size of a maximum issue width for the cache structure.

In a yet further aspect of the present invention, the storing logic includes logic for storing the bundles across line boundaries.

In a further aspect of the present invention, the accessing logic comprises: a first select logic for selecting a first column in the first cache bank based on first information from a program counter; and a second select logic for selecting a sequentially adjacent column, relative to the column selected in the first cache bank, in the second cache bank based on the first information from the program counter.

In yet a further aspect of the present invention, one of the first and second select logics includes an incrementor to selectively increment the first information from the program counter.

In yet a further aspect of the present invention, the accessing logic comprises: third select logic for receiving an input of second information from the program counter; and an bundle extraction multiplexer receiving a segment from each of the first cache bank and the second cache bank and outputting a composite segment formed from one or both of the received segments in accordance with a selector output from the third select logic.

In yet a further aspect of the present invention, an output from a decoder for one of the first and second cache bank is rotated by one.

In another aspect, the present invention further comprises: a first tag bank for storing even cache line tags; a second tag bank for storing odd cache line tags; tag select logic for accessing a tag from at least one of the first and second tag banks; and comparison logic for comparing the accessed tag to tag information from a program counter in order to obtain a validity determination for bundles associated with the accessed tag that were accessed from the first and/or second cache banks.

In another aspect of the present invention, the tag select logic comprises: first tag select logic for selecting a tag in the first tag bank in accordance with select information from a program counter; and second tag select logic for selecting a tag in the second tag bank in accordance with the select information from the program counter.

In yet a further aspect of the present invention, one of the first and second tag select logics includes an incrementor to selectively increment the respective information received from the program counter.

In another aspect of the present invention, the comparison logic comprises: first comparison logic for comparing the tag selected by the first tag select logic to tag information from a program counter and generating an output; second comparison logic for comparing the tag selected by the second tag select logic to tag information from the program counter and generating an output; and tag validity logic taking inputs from the first comparison logic and the second comparison logic and generating an output indicative of validity of the tags selected by the first and second comparison logics.

In another aspect of the present invention, the tag validity logic includes logic to selectively mask an output from one of the comparison logics if the bundle does not cross a cache line boundary.

In another aspect, the present invention further comprises: a cluster extraction multiplexer for receiving a composite segment and extracting cluster syllables.

In a further aspect of the present invention, the cluster extraction multiplexer includes: a first cluster multiplexer; a second cluster multiplexer; a first cluster select logic receiving cluster select information from the program counter and controlling an output of the first cluster multiplexer in accordance therewith; and a second cluster select logic receiving the cluster select information from the program counter and a cluster fields associated with each syllable received by the second cluster multiplexer and controlling an output of the second cluster multiplexer in accordance therewith.

In another aspect, the present invention further comprises a PC logic to determine a next value for the program counter, the PC logic including: a next bundle logic to determine in which segment a next bundle begins; and a next word address logic to determine the next word address within a segment where the next bundle begins.

In a further aspect of the present invention, the next bundle logic determines the segment in which the next bundle begins based on remaining start bits in a current segment after start bits associated with any previous bundle, a current bundle, and a next segment are masked out.

In another aspect of the present invention, the next word address logic determines the next word address by masking out start bits associated with previous bundles to obtain remaining start bits, priority encoding the remaining start bits for each segment, and then selecting a Wd value in the program counter for the next bundle.

In a further aspect of the present invention, values for $Wd_0$ and $Wd_1$ are latched prior to multiplexing, and are selected using an IB field in the program counter.

In another aspect, the present invention further comprises PC logic to determine a next value of a program counter register in branch situations that includes: logic to extract a branch instruction from a bundle, determine if the branch is taken, and if taken compute a target address; and if taken, loading logic to load the target address into the program counter register.

In another aspect, the invention further comprises a power reduction logic to enable only the first cache bank if first information is received from the second program counter, to enable only the second cache bank if second information is received from the program counter, and to always enable both of the cache banks when a branch is taken.

In further embodiment of the present invention, a method is provided for organizing a cache structure which, in turn, is organized in terms of cache lines, for use with variable length bundles of instructions (syllables), comprising: defining the cache line into a sequence of equal sized segments, and mapping alternate segments in the sequence of segments to columns in cache banks such that a first bank holds even segments and a second bank holds odd segments; storing bundles across at most a first column in the first cache bank and a sequentially adjacent column in the second cache bank; and accessing bundles stored in the first and second cache banks.

In yet a further embodiment of the present invention, a program product is provided, comprising: computer usable medium having computer readable code embodied therein for organizing a cache structure which, in turn, is organized in terms of cache lines, for use with variable length bundles of instructions (syllables), including: first code for defining the cache line into a sequence of equal sized segments, and mapping alternate segments in the sequence of segments to columns in cache banks such that a first bank holds even segments and a second bank holds odd segments; second code for storing bundles across at most a first column in the first cache bank and a sequentially adjacent column in the second cache bank; and third code for accessing bundles stored in the first and second cache banks.

DETAILED DESCRIPTION OF THE PREFERRED EMBODIMENTS

Figure 1:
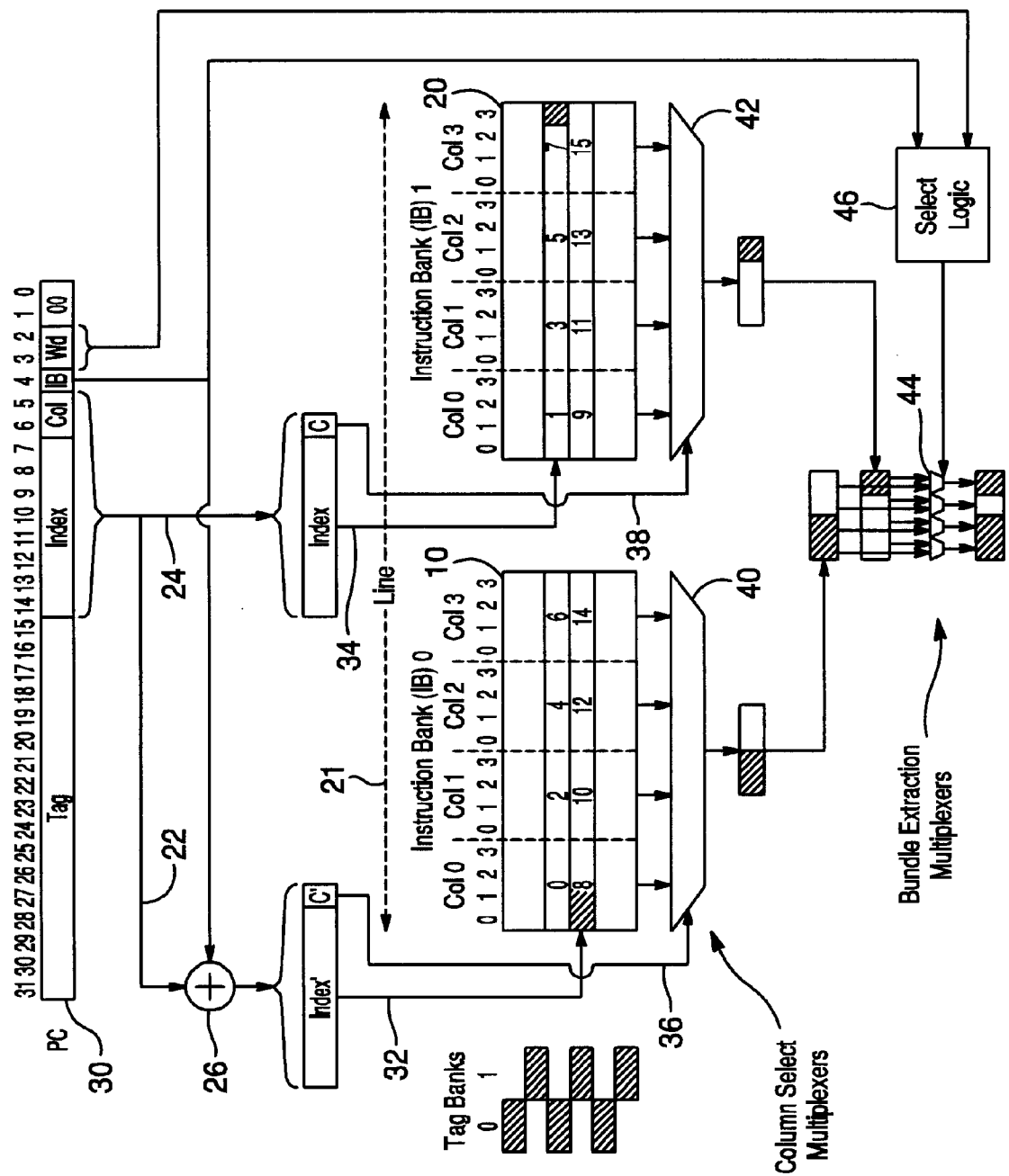
FIG. 1 is a schematic block diagram of a multi-bank cache structure.

The present invention is based on the division of each cache line 21 into equal size segments, and distributing alternate segments between two cache instruction banks. The segment size is made to be at least the size of a maximum issue width (the maximum number of operations the processor can execute per cycle), and is a power of two in order to simplify addressing. Referring to FIG. 1, a first embodiment of the multi-bank cache structure of the present invention is shown. The multi-bank cache structure of FIG. 1 comprises a first cache bank 10 that is organized in columns and rows, and a second cache bank 20, that is organized in columns and rows. The structure of FIG. 1 further includes logic for defining the cache line 21 into a sequence of equal sized segments, and mapping alternate segments in the sequence of segments to the columns in the cache banks such that the first bank 10 holds even segments, and the second bank 20 holds odd segments. The structure further includes logic for storing bundles across at most a first column in the first cache bank 10 and a sequentially adjacent column in the second bank 20. This storing logic is represented in FIG. 1 in schematic form only by the line 22, 24, and the incrementor 26. The lines 22 and 24 take the index field and the column field from a PC program counter 30. Decoders are not shown in FIG. 1. in order to avoid over-complexity in the drawing. Note that a cache line 21 straddles both cache banks 10 and 20.

In FIG. 1, a 32 word line is divided into eight, four-word segments. The first cache line 21 comprises the eight segments labeled 0 through 7, and the second cache line 21 comprises the eight segments labeled 8 through 15, assuming that each syllable is equal to one word or instruction, and the maximum width is 4 syllables.

With the above configuration, it can be seen that any two adjacent segments in the respective banks 10 and 20 may be accessed simultaneously. For example, segment 0 in column 0 of cache bank 10 and segment 1 in column 0 in cache bank 20 can be accessed simultaneously, as well as segment 1 in column 0 of cache bank 20 and segment 2 in column 1 of cache bank 10. Likewise, segment 2, in column 1 of cache bank 10 and segment 3 in column 1 of cache bank 20 may be accessed simultaneously, and so on. Even two adjacent segments that are in different cache lines (e.g., segment 7 in column 3 of cache bank 20, which can be seen to be in the first horizontal cache line in the cache bank 20, and segment 8 in column 0 of cache bank 10, which can be seen to be in the second horizontal cache line in cache bank 10. Because these segments are chosen to be at least the size of the maximum issue width for the processor, a bundle can only be distributed between two adjacent segments, independent of alignment. Thus, by accessing the segment that holds the beginning of the bundle and the following segment, the entire bundle can be constructed.

It can be seen that the value held in PC 30 indicates the cache line (via the index), the cache bank (IB=0 if an even bank and 1 if an odd bank), the column, and the word at which the bundle starts. The next sequential segment in the bundle is then held: (1) in the same column in the odd bank when the start of the bundle is in the even bank; (2) and in the column plus one in the even cache bank when the start of the bundle is in the odd cache bank; and (3) in the next cache line if the start of the bundle is in the last column of the odd cache bank. From this layout, it can be seen that the additional circuitry to select the next segment for a bundle is simply an incrementor to selectively increment the index-column of the even bank, based on the bank select bit (IB) in the PC 30. In FIG. 1 this incrementor function is represented by the use of the adder 26 in the line 22.

It can be seen from the configuration of FIG. 1, that the access of the segments within the various cache lines is controlled in accordance with an input of the index' on line 32 for cache bank 10 and the index on line 34 for cache bank 20. Column select multiplexers 40 and 42 are utilized to select an appropriate column from each of the cache banks 10 and 20 in order to obtain the segments which contain the bundle. In the example illustrated in FIG. 1, the bundle is contained in the last portion of segment 7 in column 3 of cache bank 20 (the first cache line) and in the first portion of segment 8 (the second cache line) of column 0 of cache bank 10. Column select multiplexer 40 for cache bank 10 is controlled in accordance with the COL' signal on line 36. Likewise, the column select multiplexer 42 is controlled by the COL signal on line 38. In accordance with the COL' signal, in columns 0 in the second cache line (segment 8) is selected by the column select multiplexer 40. Likewise, the COL signal on line 38 causes column 3 in the first cache line (segment 7) to be selected by the column select multiplexer 42.

FIG. 1 illustrates an example in which the desired bundle (shown in black in the cache banks 10 and 20) is 3 syllables in length and starts in the last word in column 3 of the cache bank 20 (segment 7 in the first cache line). In this example, the remaining portion of the bundle comprising the next two words is held column 0 of the next cache line in the even cache bank 10 (segment 8).

After the two segments that hold the desired bundles are accessed, the pieces of the bundle can be extracted. Because the output of the two cache banks 10 and 20 are adjacent segments, and each is equal in length to the maximum issue width, then if the segments are laid on top of one another, no piece of the same bundle will overlap. Thus, in FIG. 1, the extraction circuitry comprises a group of 2-to-1 multiplexers 44. The number of these multiplexers is equal to the number of syllables in a segment. Each multiplexer in the group of multiplexers 44 receives an input from the same word location in the two selected segments from the column select multiplexers 40 and 42 and selects one of those word locations.

A third select logic 46 is used to control the selection performed by the multiplexers 44. In the embodiment shown in FIG. 1, this selection is accomplished by determining the start of the bundle address. In order to obtain information on the start of the bundle address, the select logic 46 takes as inputs the IB field and the Wd field from the PC 30. For a four issue machine, the truth table for the select logic is presented in Table 1. In this case, a "0" indicates that the syllable is selected from the even bank 10, while a "1" indicates that the syllable is selected from the odd cache bank 20.

It should be noted that in a preferred embodiment the decode pipeline stages that follow the instruction set of FIG. 1 should be able to handle the syllables in any order. However, other implementations may require that the beginning of the bundle be aligned. In that case, the output merely needs to be rotated left by the value specified in the word bit field Wd.

Accordingly, the bundle extraction multiplexers 44 obtain the third syllable from column 3 in the first cache line of the cache bank 20, as well as the first three syllables from column 0 of the second cache line in the cache bank 10 (segment 8). The 4 syllables are then passed to a decode stage, in which the syllables 3, 0 and 1 are tagged valid and syllable 2 is tagged invalid.

Figure 2B:
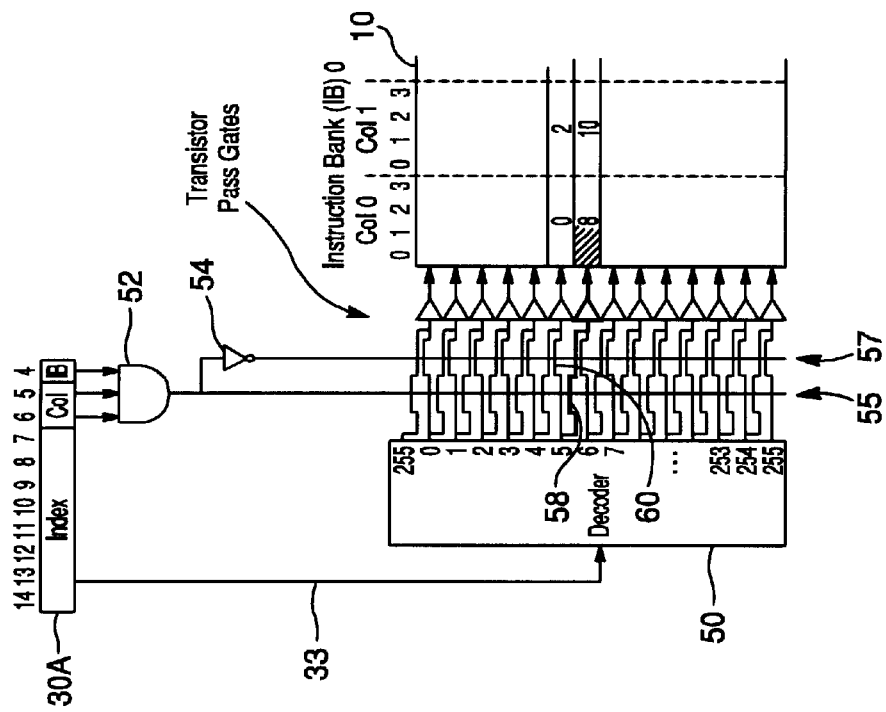
FIG. 2B is a schematic diagram of instruction bank incrementor alternative.
Figure 2A:
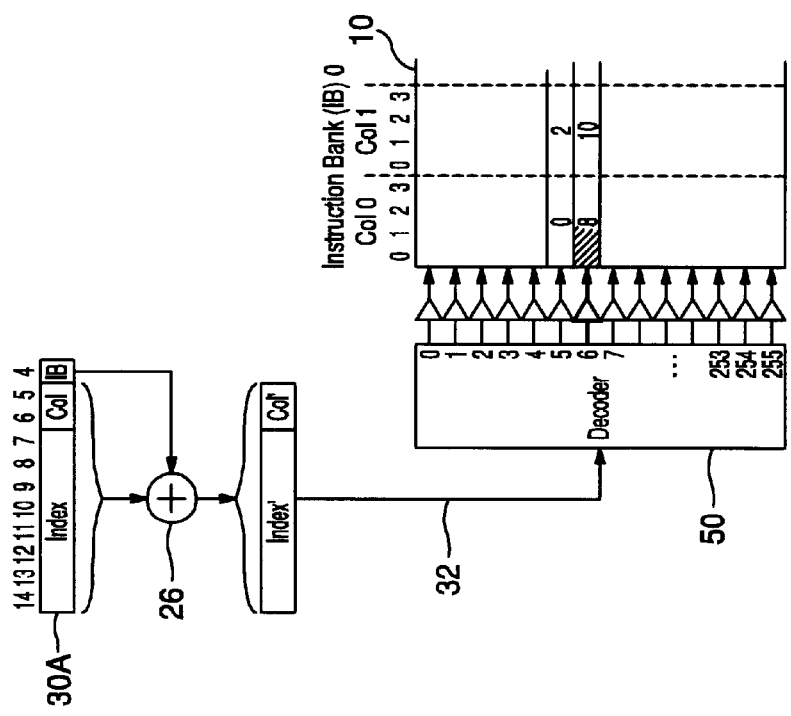
FIG. 2A is a different schematic diagram of the configuration of FIG. 1.

A concern that may arise with the configuration of FIG. 1 is that it places an incrementor 26 on what is commonly referred to as the critical path. A solution to this addition of the incrementor to the critical path is to move the functionality of the incrementor to the output side of the RAM decoder, as shown in FIG. 2. FIG. 2A illustrates an abbreviated portion of FIG. 1 showing only the index, the COL and IB fields in the program counter, designated in FIGS. 2A and 2B as 30A. The configuration is shown for only the cache bank 10, for the sake of simplicity, and includes the adder 26, the index line 32 and a decoder 50 for applying decoded signals to the cache bank 10. FIG. 2B shows a further embodiment wherein the functionality of the incrementor is moved to the output side of the RAM decoder 50. In this new embodiment, the incrementor functionality is implemented by selectively rotating the output of the RAM decoder 50 by one. It can be seen that this rotation is accomplished by providing the COL and IB fields from the program counter 30A to an AND gate 52 and applying the output of the AND gate 52 to the gates of a first set 55 of decoder output transistors, each transistor in the set being connected at one end to a different output of the decoder 50 and at the other end to a different line in the cache bank 10. The output from the AND gate 52 is also applied via an inverter 54 to the gates of a second set 57 of transistors, each transistor in the set being connected at one end to a different output of the decoder 50, and at the other end to an adjacent line in the cache bank 10. By way of example, if the output of the AND gate 52 is high, then the output 5 from the decoder 50 is applied to the second cache line in the cache bank 10 via a transistor 58 in the first set of transistors 55. This is indicated by the heavier line for one of the transistors connecting output 5 to the second cache line in the cache bank 10. Alternatively, it can be seen that if the output from the AND gate 52 is low, then a transistor 60 in the second set of transistors 57 is energized to connect output 5 from the decoder 50 to cause the access to be to the first cache line in the cache bank 10. Note that various other circuit configurations could be utilized in order to accomplish the same functionality of rotating the output of the RAM decoder by one.

It can be seen that this configuration only adds one pass gate delay to the critical path. Since the cache banks (RAM) are half as wide as they would normally be because of the banked configuration, this implementation should be typically faster than the non-banked implementation. Also, to minimize signal length, the shift from the last decoder output to the first decoder output (i.e. 255 to 0) is implemented by replicating the last output decode next to the first output decode. Finally, note that the column field must still be implemented to select the correct column. However, the column field selection is not in the critical path and is thus not shown in FIG. 2.

As noted above, the final step in this initial process is to tag each syllable as valid if it is part of the desired bundle. Because the bundles vary in length, the output of the previous steps in the foregoing configuration may contain syllables from later bundles. These syllables from later bundles are tagged as invalid or converted to NOP's for this cycle. Start bits are used to indicate the beginning of a bundle, i.e., the start bit is a "1" if it is a syllable that begins the bundle, and the start bit is a "0" if the syllable is not the beginning of a bundle. Accordingly, syllables from the start of the bundle (start bit=1) to the next start occurring start bit (start bit=1) may be tagged valid, while all other syllables in the segments that have been accessed are deemed invalid (including the syllable with the next start bit). A more detailed discussion of this validity tagging step will be provided later in the specification.

A further aspect of the present invention relates to the use of a tag array. It is preferred to use a separate tag array within the cache in order to hide the latency of the comparison operation. It can be seen from the foregoing configuration that a bundle is distributed between two cache banks, but only one tag is associated with each cache line. Thus, the tag from the program counter PC 30 cannot be split and distributed in the same manner as the instruction syllables. One approach is to duplicate the tag RAM, thus associating one tag with each of the cache banks. The tag RAM would use the same indexing as the cache banks (instruction RAMs). This configuration offers the advantage that the tag RAM can be part of each cache bank's instruction array and can share decode logic. The disadvantage is that the tag RAM is duplicated.

Figure 3:
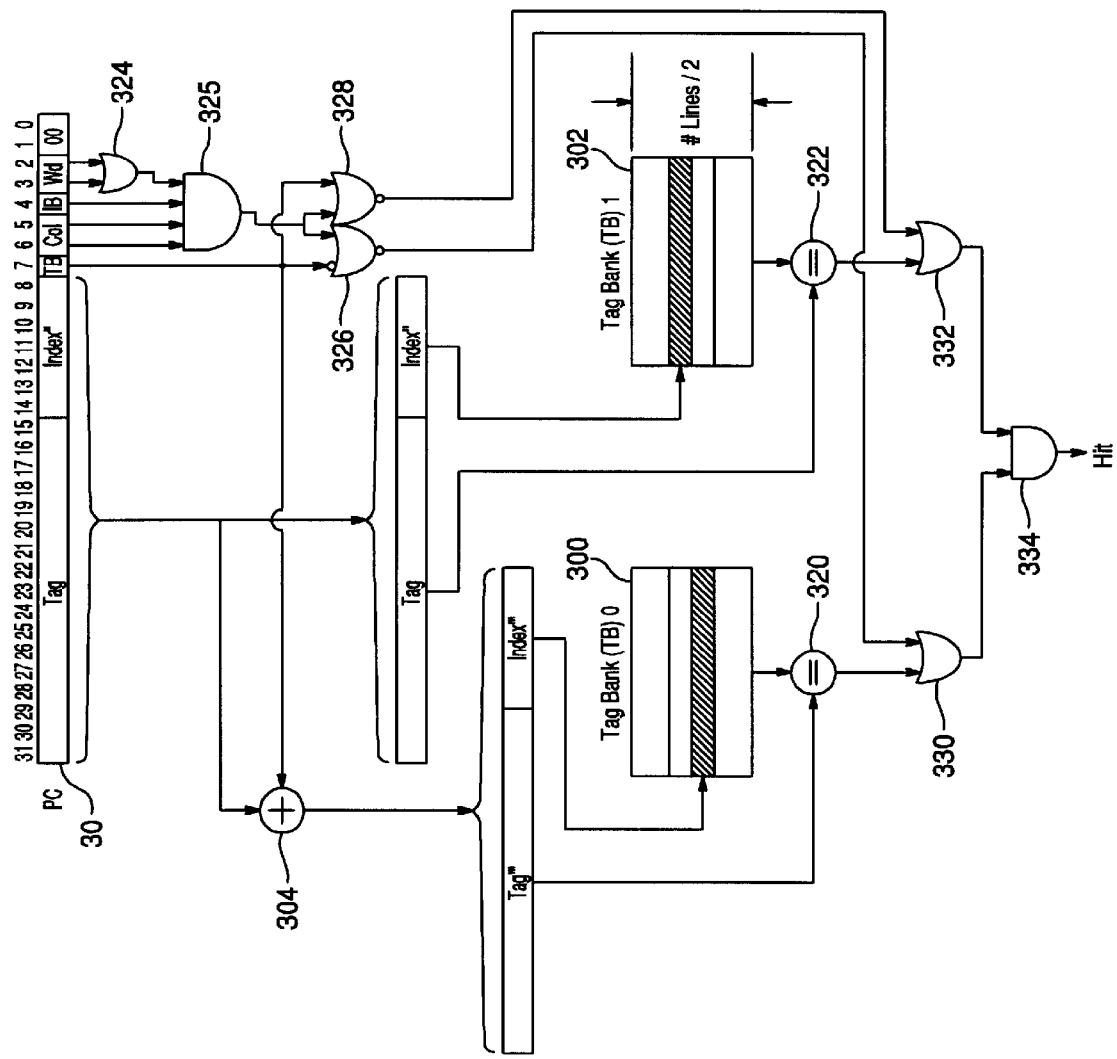
FIG. 3 is a schematic block diagram of a multi-bank tag structure.

In a preferred embodiment, the tag RAM is partitioned into two tag banks. One tag bank holds the tag associated with even cache lines, while the other tag bank holds the tags associated with the odd cache lines. Note that this even/odd cache line distribution is different from the instruction cache banks which distribute the instruction segments based on even and odd segments, not cache lines. FIG. 3 illustrates an implementation of this preferred embodiment. FIG. 3 is shown with the program counter 30 as described in FIG. 1. However, note that the configuration of FIG. 2 could also be utilized in this implementation. Referring now to FIG. 3, it can be seen that a first tag bank 300 is provided for storing even cache line tags, and a second tag bank 302 is provided for storing odd cache line tags. The least significant bits of the index, labeled TB for the Tag Bank in the program counter 30, specifies whether the PC 30 points to the even or first tag bank 300, or the odd or second tag bank 302. It can be seen from the configuration that the even tag index for the first tag bank 300 is selectively incremented based on whether the start of the bundle begins on an even or an odd cache line. This selective incrementation is accomplished by the adder 304, which adds a "1" based on the value of the TB field in the program counter 30.

Figure 4B:
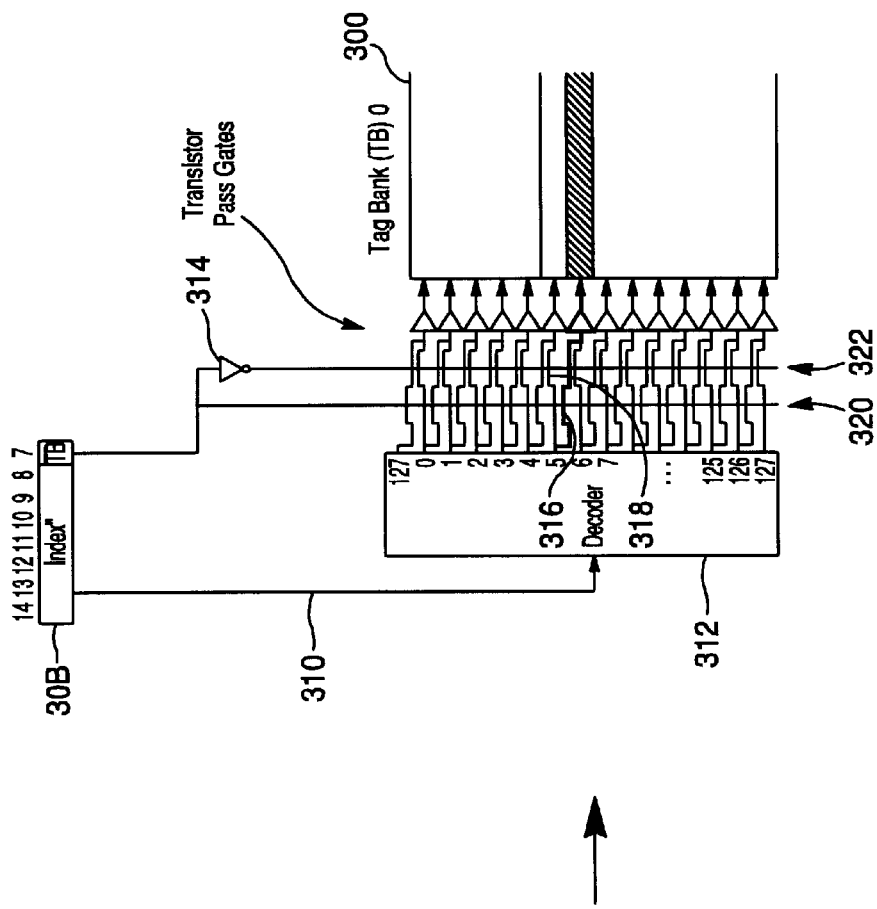
FIG. 4B is a schematic block diagram of a multi-bank tag increment alternative.
Figure 4A:
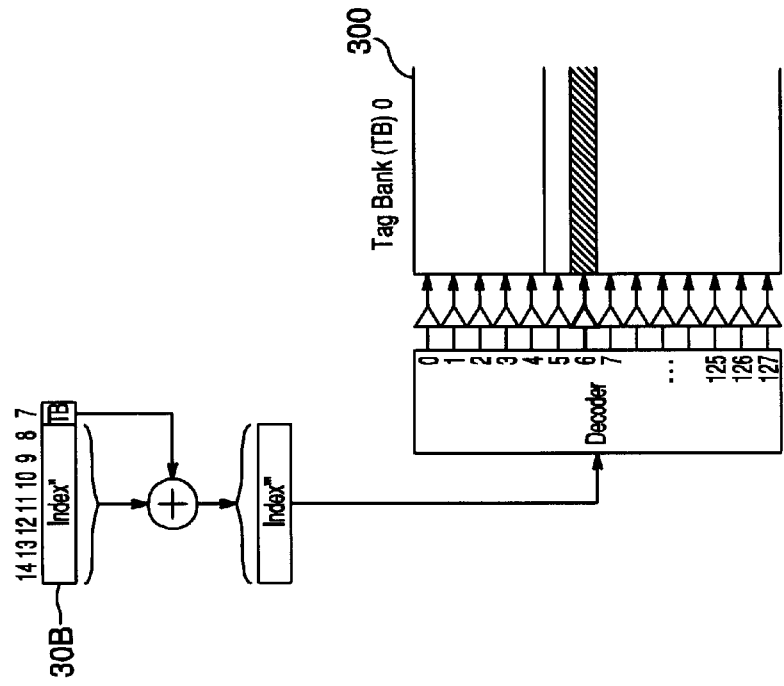
FIG. 4A is a different schematic diagram of the configuration of FIG. 3.

Note that this incrementor 304 may again be on the critical path, so that a selective rotation by one can be used after the decoder (not shown) for the first tag bank 300 in order to reduce the added delay. This configuration with the selective rotate by 1 is shown in FIG. 4B. FIG. 4A illustrates the configuration of the incrementor as shown in FIG. 3. In FIG. 4B it can be seen that the index field from the program counter 30B is applied on line 310 directly to decoder 312 for a first tag bank 300 (the even tag bank). Again, it should be noted that the program counter in FIG. 4 is represented only by the index field and TB field. The transistor configuration shown operates in the same fashion as the transistor configuration shown in FIG. 2. In this regard, each transistor in a first set of transistors 320 is connected at one end to a different one of the outputs from the decoder 312 and at the other end to a different line in the tag bank 300. The gates of this set of transistors 320 are connected to the TB field from program counter 30B. Each transistor in a second set of transistors 322 is also connected at one end to a different output of the decoder 312 but connects at the other end to an adjacent line in the tag bank 300. The second set of transistors is connected via an inverter 314 to the TB field in the program counter 30. By way of example, transistor 316 of the first set of transistors 320 is connected to output 5 of the decoder 312 and is energized if the TB field is a "1" and connects to one line in the tag bank 300. Likewise, the transistor 318 in the second set of transistors 322 is also connected to the output 5 of the decoder 312, but is energized if the value of the TB field in the program counter 30 is a "0", and connects to an adjacent line in the tag bank 300.

Referring again to FIG. 3, comparison logic is provided for comparing the accessed tag to tag information from the program counter, in order to obtain a validity determination for bundles associated with the accessed tag that were accessed from the first cache bank 10 and/or the second cache bank 20. In the implementation shown in FIG. 3, the comparison logic comprises a first comparison logic 320 for comparing the tag selected by the first tag select logic to tag information from the program counter 30 and generating the output. The comparison logic further includes a second comparison logic 322 for comparing the tag selected by the second tag select logic to tag information from the program counter 30 and generating an output. Finally, the comparison logic include tag validity logic, which in the implementation shown in FIG. 3 comprises the gates 324, 326, 328, 330, 332, 334 and the AND gate 325. The tag validity logic takes inputs from the first comparison logic 330 and the second comparison logic 322 and generates an output indicative of validity of the tag selected by the first and second comparison logics. The foregoing gates in the tag validity logic selectively mask the hit signal from the first tag bank 300 (the even tag bank) or from the second tag bank 302 (the odd tag bank) if the bundle does not cross a line boundary. The truth table for the gates 324, 325, 326, and 328 is shown in Table 2.

It should be noted that this tag validity logic configuration adds two gates to a critical path. However, the tag RAM's are half as deep, which should offset the added delay. The advantage to this multi-tag bank approach is that no duplicate tags are required. The disadvantage is that it does require the tag RAM's to be separate from the instruction RAM's. However, this disadvantage is already the case in most configurations since tag arrays are commonly separated from the instruction array in order to meet timing constraints.

Figure 5:
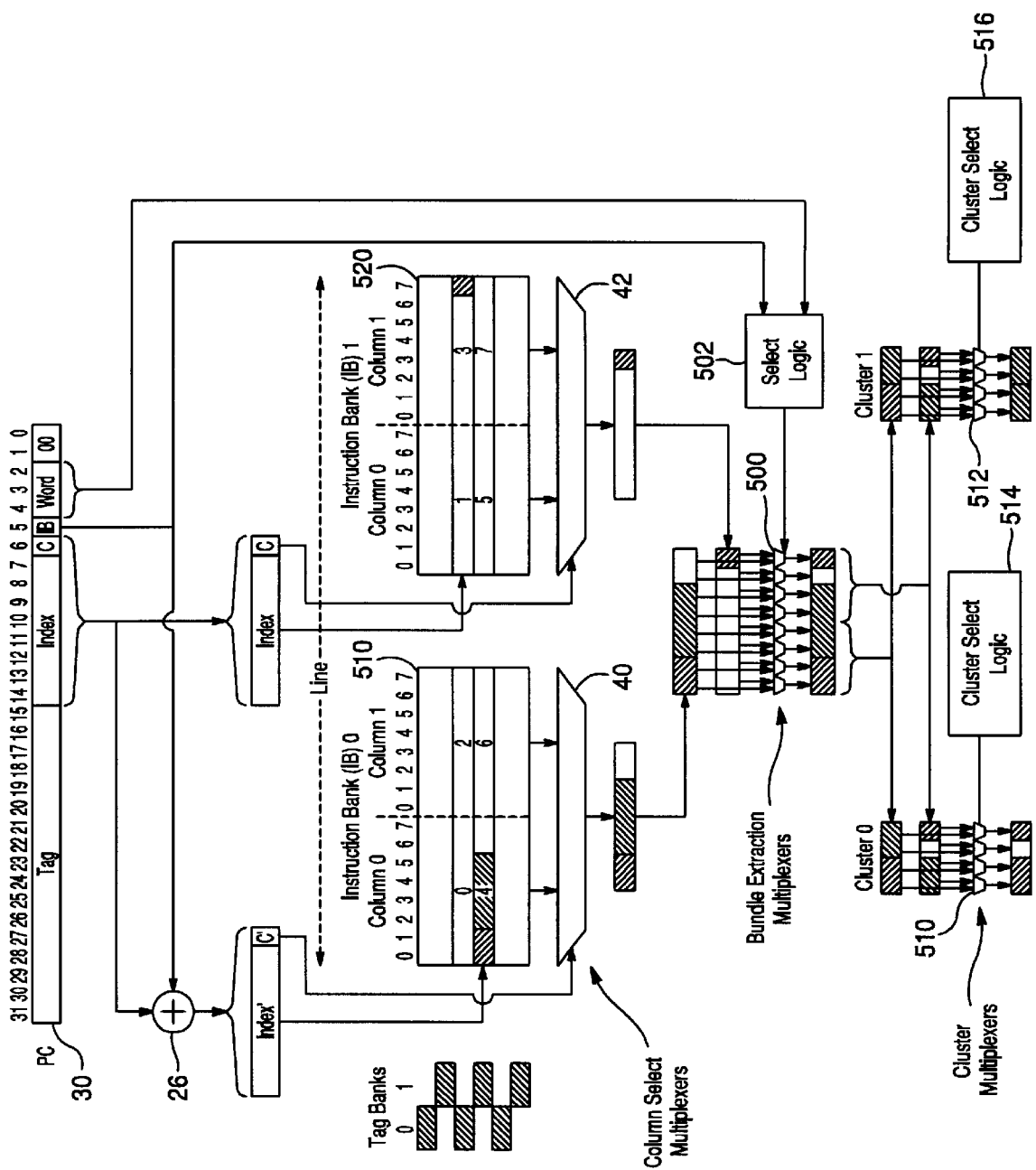
FIG. 5 is a schematic block diagram of a multi-cluster implementation in accordance with the present invention.

One advantage of the present invention is that it can be easily scaled to support multiple clusters (i.e., greater issue widths). FIG. 5 presents a further embodiment of the present invention for a two-cluster implementation in which each cluster is capable of issuing four syllables. It should be noted that the line size for this configuration does not change. In fact, no changes are required for the tag structure for this configuration. With two clusters, the maximum issue width is 8. Therefore, the cache line is divided into four 8-word segments (the first cache line comprises segments 0 through 3, and the second cache line comprises segments 4 through 7, distributed between the two cache banks 510 and 520. The bits within the program counter 30 still indicate the line, bank column, and word at which the bundle start, although the number of bits and the position within the program counter 30 may change, dependent on the number of clusters. The differences between the one cluster configuration and the two cluster configuration are: (1) the column select multiplexer 500 is now a 256-bit 2-to-1 multiplexer instead of the 128-bit 4-to-1 multiplexer used for the single cluster; and (2) an additional level of 2-to-1 multiplexers 510 and 512 are added to extract each cluster syllable.

Figure 6:
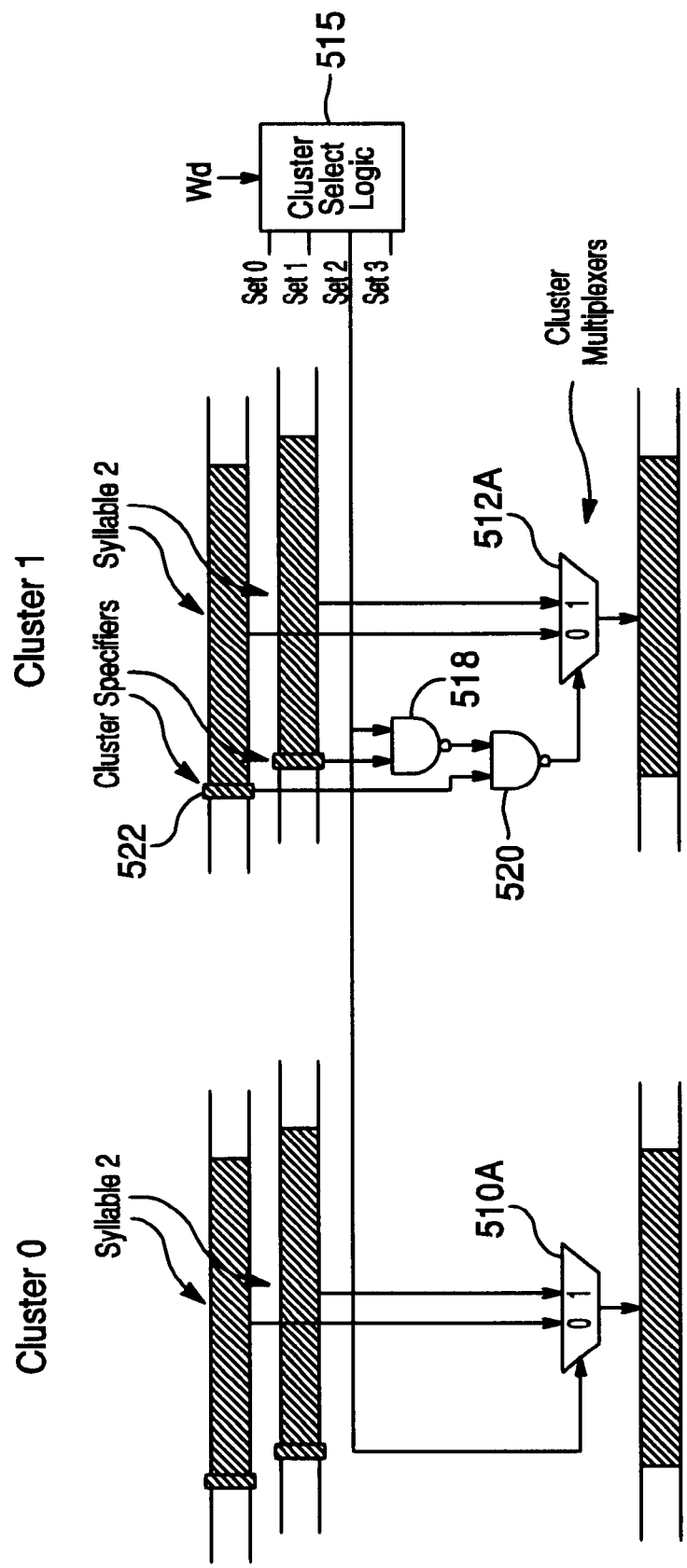
FIG. 6 is a schematic diagram of cluster select multiplexers and logic in accordance with the present invention.

Cluster select logic 514 selects the correct syllables for the first cluster multiplexer 510, and the cluster select logic 516 selects the correct syllables for the second cluster multiplexer 512 (the odd cluster multiplexer). Details of the first and second cluster select logics 514 and 516 are shown in FIG. 6, and the logic therefore is set forth in the truth Table 3. Because the even cluster 0 syllables come first, the first cluster select logic 514 is implemented in FIG. 6 by a cluster select logic 515 which takes as an input the three bit word field (Wd) of the program counter 30, and provides an outputs select line for each multiplexer in 510. Shown is the signal for the $3^{rd}$ multiplexer in 510, labeled 510A. This signal provides an output on the Sel 2 output line to the multiplexer 510A in the group of first cluster multiplexers 510. The signal on Sel 2 will select which of the syllables from the clusters to pick. Note that a "0" indicates that the syllable is chosen from the upper four words, and a "1" indicates that the syllables are chosen from the lower four words.

The second cluster selects logic 516 is implemented in FIG. 6 by the cluster select logic 515 and the NAND gates 518 and 520. Again, the truth Table 3 specifies whether the syllables in the upper four words or the lower four words is taken.

In view of this configuration, the cluster specifier field associated with each syllable is used in computing the select. The rule followed is: The syllable with the cluster specifier set to the current cluster (e.g. 1), is selected. The cluster specifier field is the bit indicated at 522 in FIG. 6. If neither or both cluster specifier fields are set to the current cluster, the correct syllable is chosen based on the value of the output at the cluster select logic 515. This logic is implemented using the two NAND gates 518 and 520 in FIG. 6.

It is evident to one of ordinary skill in the art that the implementation shown in FIGS. 5 and 6 can be further extended to a four cluster implementation. In the four cluster case, the maximum issue width will become sixteen syllables, thereby eliminating the need for the column select multiplexers. For such an expansion, another level of 2-to-1 multiplexers will be added in addition to the cluster multiplexers 510 and 512 in order to separate the access syllables into four clusters. In one embodiment, the two levels of cluster multiplexers could be implemented as one level of 4-to-1 multiplexers. Beyond four clusters, a 32 issue machine will have an issue width equal to the line size and the instruction banks will need to be partitioned in bundles distributed on a cache line basis.

Figure 7:
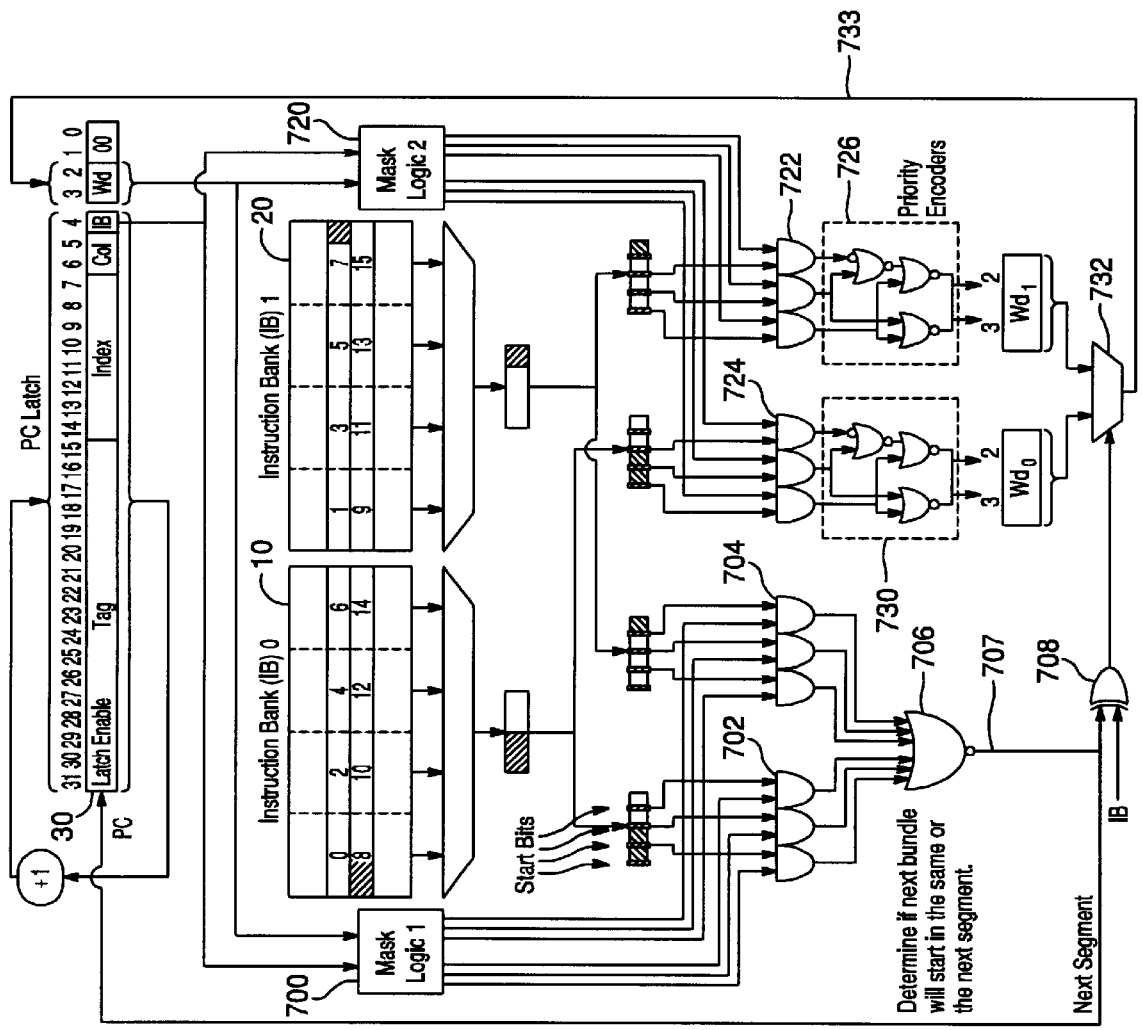
FIG. 7 is a schematic block diagram of the additional circuitry needed for a next PC computation in accordance with one embodiment of the present invention.

When working with variable length instructions, the calculation of the next value of the program counter 30 is commonly on the critical path. FIG. 7 discloses an embodiment to calculate the next value of the program counter 30. At the top of the figure is shown the register that holds the program counter 30. Note that although the instruction banks 10 and 20 are shown in the figure, the other logic associated therewith is not shown for purposes of clarity of the description. As noted previously, the value in the program counter 30 is used to access the cache (instruction) and tag banks, the tag compare, and then to extract the requested bundle.

Associated with each syllable of an access segment is a start bit, used to indicate the beginning of each bundle. Start bits are usually the MSB of each syllable and are shown as gray bars in FIG. 7. The first syllable of the bundle in the access segment will have its start bit set equal to "1". All other syllables that follow this first syllable will have their start bit set equal to "0". The bundle is defined by this first syllable with its start bit set equal to "1", and all following syllables that have start bits set equal to "0". If another syllable is reached with its start bit set equal to "1", then this is an indication that the current bundle has ended and that a new bundle has begun in that segment. Accordingly, the Tag, Index, Column (COL), Instruction Bank (IB) field of the program counter 30 do not change in that situation. If no start bits set equal to "1" are found in any of the syllables in the same segment after a bundle bit has been detected, then it is known that the next bundle will start in the next segment. In this case, the program counter register 30 is updated with an incremented value.

The circuitry configuration to compute whether the next bundle starts in the next segment is located on the bottom left of FIG. 7 and comprises a next bundle logic including a mask logic 700, a first set of AND gates 702, a second set of AND gates 704, and a NOR gate 706. The first step in the operation of the next bundle logic is to mask out the start bits associated with any previous bundle, the current bundle, and the next segment. The determination as to which start bit should be masked is performed in the Mask Logic 700, whose truth table is presented in Table 4. Note that this computation in the Mask Logic 700 is only dependent on the instruction bank (IB) field and the word (Wd) field of the current value in the program counter 30, and can thus be computed during the instruction bank and tag bank accesses. The start bits are then masked by ANDing the masked bits with the start bits in the respective syllables. This masking is accomplished with the sets of AND gates 702 and 704, and the NOR gate 706. Once masked, if no start bit remains, then the next bundle will start in the next segment and the Tag, Index, Column and Instruction Bank fields are updated. Alternatively, if any start bit remains after this masking operation, then the next bundle will start in the same segment, and the Tag, Index, Column, and Bank fields will remain unchanged.

FIG. 7 also includes a next word address logic to determine the next word address within a segment. Next word address information is generated from the start bits. In accordance with FIG. 7, the Tag, Index, Column and Instruction Bank fields are updated only when the next segment signal is inserted. This logic is accomplished by taking the output from the NOR gate 706 and applying it to an exclusive OR gate 708. The exclusive OR gate is only used for the next Wd field generation along with the input from IB field. However, the word (Wd) field must be updated after each bundle is executed. In addition, the word (Wd) field is incremented by a variable value dependent on the start bits.

Shown at the bottom-right of FIG. 7 is next word address logic to compute the next word address value (Wd). This logic includes, in the embodiment shown in FIG. 7, Mask Logic 720, two sets of AND gates 722 and 724, a first priority encoder 726, second priority encoder 730, and a select multiplexer 732. In this operation, Mask Logic 720 functions to mask any start bits associated with previous bundles out. The truth table for the Mask Logic 720 in order to make this determination is set forth in Table 5. Because this masking determination is only dependent on the Instruction Bank field and the word (Wd) field, this logic can be performed during bank accesses. The start bits are masked by ANDing the mask bits with the start bits of the respective syllables in the set of AND gates 722 and 724. The result of this masking operation for each segment is then priority encoded by priority encoders 726 and 730. The multiplexer select logic 732 operates to select either the $Wd_0$ or $Wd_1$ values in accordance with the output from the exclusive OR gate 708. As noted above, the gate 708 takes as an input the Next Segment signal from the gate 706 and the IB input. Thus, once encoded, the value associated with the next bundle is selected and loaded into the program counter register 30. Note that the Tag, Index, Col, and IB get updated when the Next Segment signal is asserted. Otherwise they hold their current value. The Wd field is updated every cycle.

Figure 8:
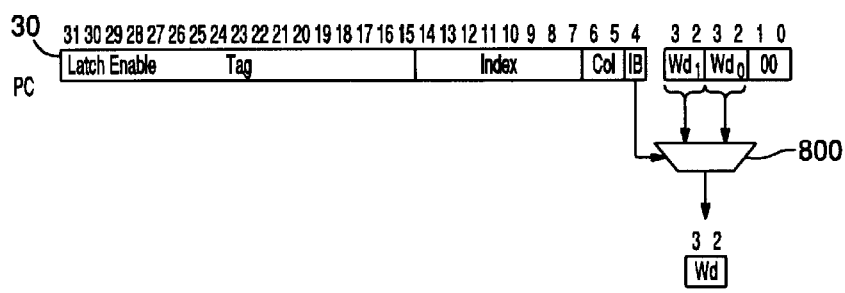
FIG. 8 is a schematic diagram of a next PC critical path optimization circuit in accordance with one embodiment of the present invention.

Note that in FIG. 7, the critical path is the computation of the word address. An optimization for this configuration is to latch the values for $Wd_0$ and $Wd_1$, prior to the multiplexer. Such a configuration would push the multiplexer location to after the PC register. The select signal would then be the IB field, as shown in FIG. 8. Note that the latching is accomplished in FIG. 8 by the latch 30. This configuration is reasonable, since the Wd field is only used by the third select logic in FIG. 1 in the Mask Logic 700 and 720 in FIG. 7. All of these blocks are performed in parallel with the bank accesses and are not on the critical path. By latching the Wd field in the fashion shown in FIG. 8, the critical path becomes the time to access the segments, mask the start bits, and priority encode the results. Note that this is not part of the architecture which is visible to the program. In operation, when the value in the program counter 30 is accessed by the program, the value after the multiplexer is used. Similarly, on a taken branch, the Wd field of the target is loaded into both the $Wd_0$ and $Wd_1$ latches. This ensures correct behavior, while hiding the fact that the multiplexing is occurring. Branching operation will be discussed below.

Finally, it should be noted that the present incrementation scales well. As the number of start bits doubles, the number of inputs to the Next Segment NOR gate is also doubled. This doubling adds approximately 1 gate. Also, as the number of start bits doubles, the priority encodes also add 1 gate. These are in parallel, so the net effect is one added gate delay. However, these are offset by the fact that the instruction bank column select multiplexers eliminate 1 gate delay. Thus, the critical path for one or for multiple clusters is approximately equivalent.

In a further aspect of the present invention, logic is provided for handling branches. The occurrence of a branch constitutes a break in the sequential flow of instructions. In accordance with present invention, logic to determine a next value of the program counter in branch situations includes logic to extract a branch instruction from a bundle, logic to determine if the branch is taken, and if taken, logic to compute a target address. This branch extraction logic is implemented in FIG. 9 by the decoder 900, the branch condition logic 902, and the target address generator 904. Note that this branch extraction logic is shown in the context of FIG. 1, including the program counter 30, the first cache bank 10, the second cache bank 20, and the column select multiplexers 40 and 42. Note that many details of the multi-bank cache structure are not shown for purposes of clarity. The second step of actually loading the branch target address into the program counter latch when the branch is taken is implemented by the logic shown in FIG. 10, to be discussed below.

Figure 9:
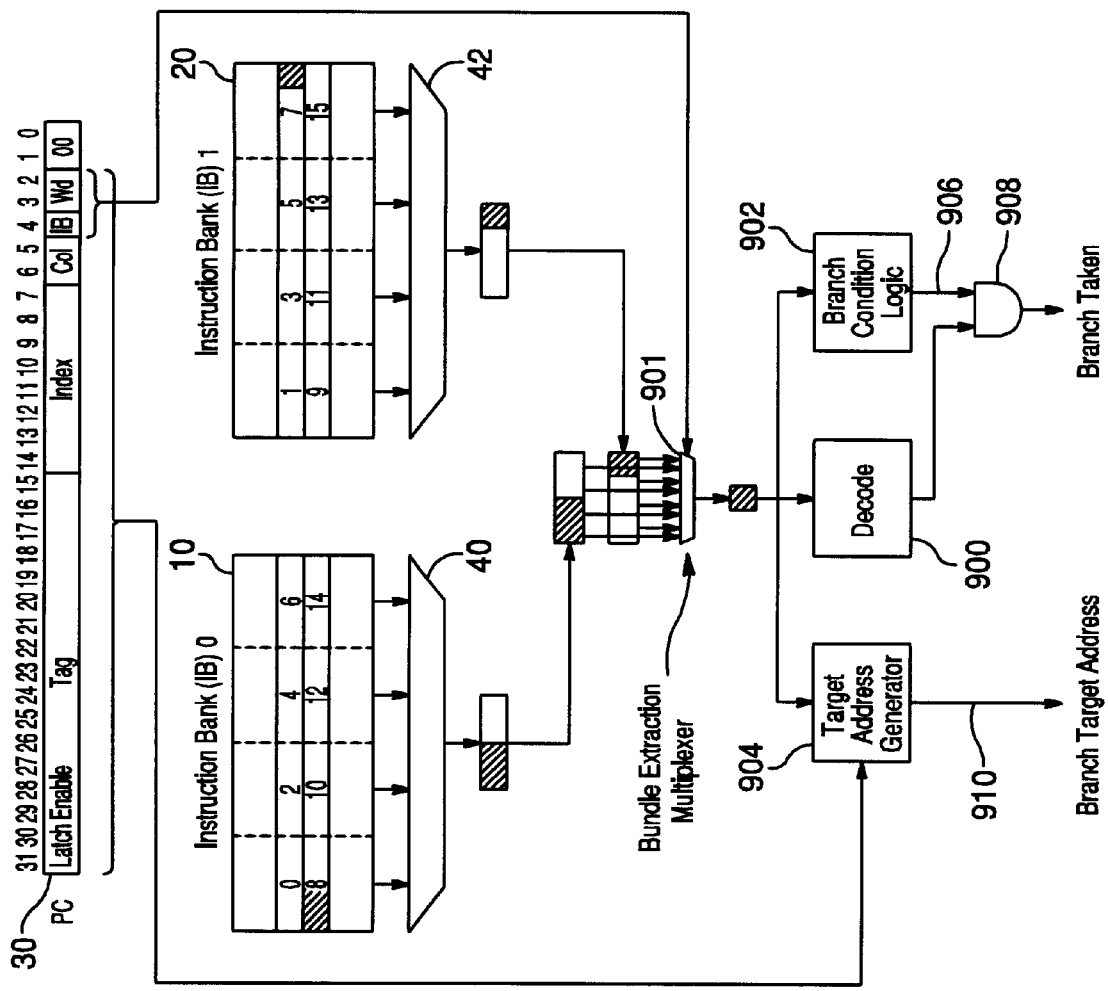
FIG. 9 is a schematic block diagram of logic to generate branch targets and conditions in accordance with one embodiment of the present invention.

Referring to FIG. 9, the appropriate syllable of the bundle must be extracted (or two syllables are extracted if supporting a branch with a 32 bit immediate), in order to examine the specified bit in the branch condition register, and to compute the target address. In a preferred embodiment, if there is a branch in a bundle, then the branch is located in the first syllable in the bundle. Accordingly, only the first syllable (or first two syllables) are extracted by the branch extract multiplexer 901. Note that the branch extract multiplexer 901 takes as its inputs the IB and Wd fields from the program counter 30. Note that the bundle extraction multiplexer 901 will extract 4 out of 8 syllables.

This first syllable (or first two syllables) is provided to a decoder 900 in order to decode the instruction in the first syllable. In order to save time, in a preferred embodiment the syllable input may also be applied simultaneously to the branch target logic 902 and the target address generator so that those logics can simultaneously be operating while the decode block 900 is performing its decoding operation. Thus, the branch condition logic 902 and the target address generator would speculatively generate whether the branch is taken and the target address.

The decoder 900 examines the specified bits in the instruction in order to determine whether this instruction or syllable is a branch instruction. Note that the output signal from the decode block 900 indicating whether this is a branch is applied as one input to an AND gate 906. The other input to the AND gate is from the branch conditional logic 902 and is an indication as to whether the branch is taken. If both inputs to the AND gate 906 are "1", then the output from the AND gate 906 on line 908 is a "1", indicating that it is a taken branch.

Figure 10:
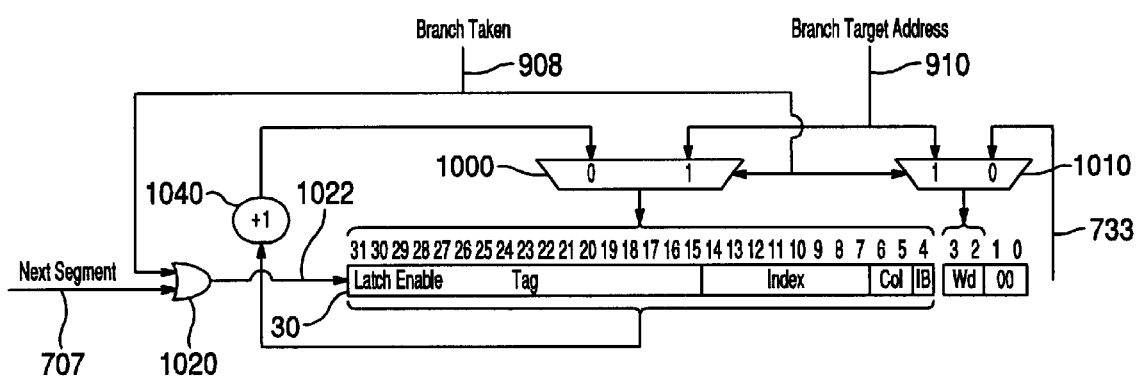
FIG. 10 is a schematic block diagram of branch logic that may be utilized with the logic of FIG. 9 to implement a PC increment circuit in accordance with the present invention.

Referring now to FIG. 10, there is shown logic for computing the second step of loading the branch target address into the PC latch when the branch is taken. This logic comprises a multiplexer 1000, a multiplexer 1010, and OR gate 1020, the program counter 30, and an incrementor 1040. In operation, when a branch is taken, the "1" signal on line 908 from FIG. 9 is applied as an input to the OR gate 1020. The other input to the OR gate 1020 is the Next Segment signal on line 707 from FIG. 7. When a branch is taken and the signal on line 908 is "1", then the latch enable signal on line 1022 from OR gate 1020 is asserted. Note that the branch taken signal 908 is also applied as the control signal for the selector multiplexer 1000. Accordingly, with the branch taken signal on line 908 being "1", the branch target address on line 910 from FIG. 9 is applied to the selector multiplexer 1000 and is loaded into the PC latches 30. Note that the branch taken signal 908 also is applied as the control signal for the multiplexer 1010. Thus, the branch target address on line 910 is also applied via the multiplexer 1010 to the Wd field in PC latch 30. It should be noted that if the implementation provided in FIG. 8 is utilized, (i.e., $Wd_0$ and $Wd_1$ are latched), then the branch target ($W_d$) field must be loaded into both the $Wd_0$ and $Wd_1$ locations (not shown). Note that if the branch is not taken, so that the signal on line 908 is "0" and Next Segment signal on line 707 is asserted to 1, then the value in the PC latch 30 is incremented by +1 in the incrementor 1040 and applied back through the selected multiplexer 1000 to be loaded into the PC latches 30. Otherwise, the Tag, Index, Col, and IB fields of the PC register hold their current value. Note that the Wd field output from multiplexer 732 of FIG. 7 is applied as the other input to the multiplexer 1010.

It can be seen that the branch logic of FIGS. 9 and 10 scales well as clusters are added. As the issue width doubles, the branch extract multiplexer input selections also double. This configuration adds one gate delay to this multiplexer. However, doubling of the issue width halves the selections of the column select multiplexer, thereby eliminating one gate delay. After extraction, the added branch circuitry is independent of issue width. Thus, no net increase in gate delays is realized. If it is assumed that pipeline stage flops are placed after the branch extract multiplexer, then the branch decode block 900, the branch condition logic 902, and the target address generator 904 are pushed to a second stage. The second stage should have ample time to complete these functions, leading to one branch delay slot, independent of the number of clusters and the issue width.

As noted above, once the bundle and the syllables of each cluster are extracted, any syllables not associated with the bundle or cluster are tagged invalid. By the end of the fetch stage, both the start and the end of the syllables of each cluster are known. This information may be passed to the decode stage (i.e., the stage following the fetch stage) and valid entries computed in parallel with the decoding. Thus, by the end of the decode stage, any syllables that are determined as invalid are nullified.

In order to reduce power, it is desirable that the cache banks (RAMs) should be accessed as infrequently as possible, and shut-down when not in use. It is assumed that "keep cells", latches or a similar functional equivalent are disposed on the outputs of the cache banks/RAMs. Keep-cells are common in RAM output drivers and cause those drivers to remain driving the last accessed output when the bank is disabled (i.e., CE de-asserted).

Figure 11:
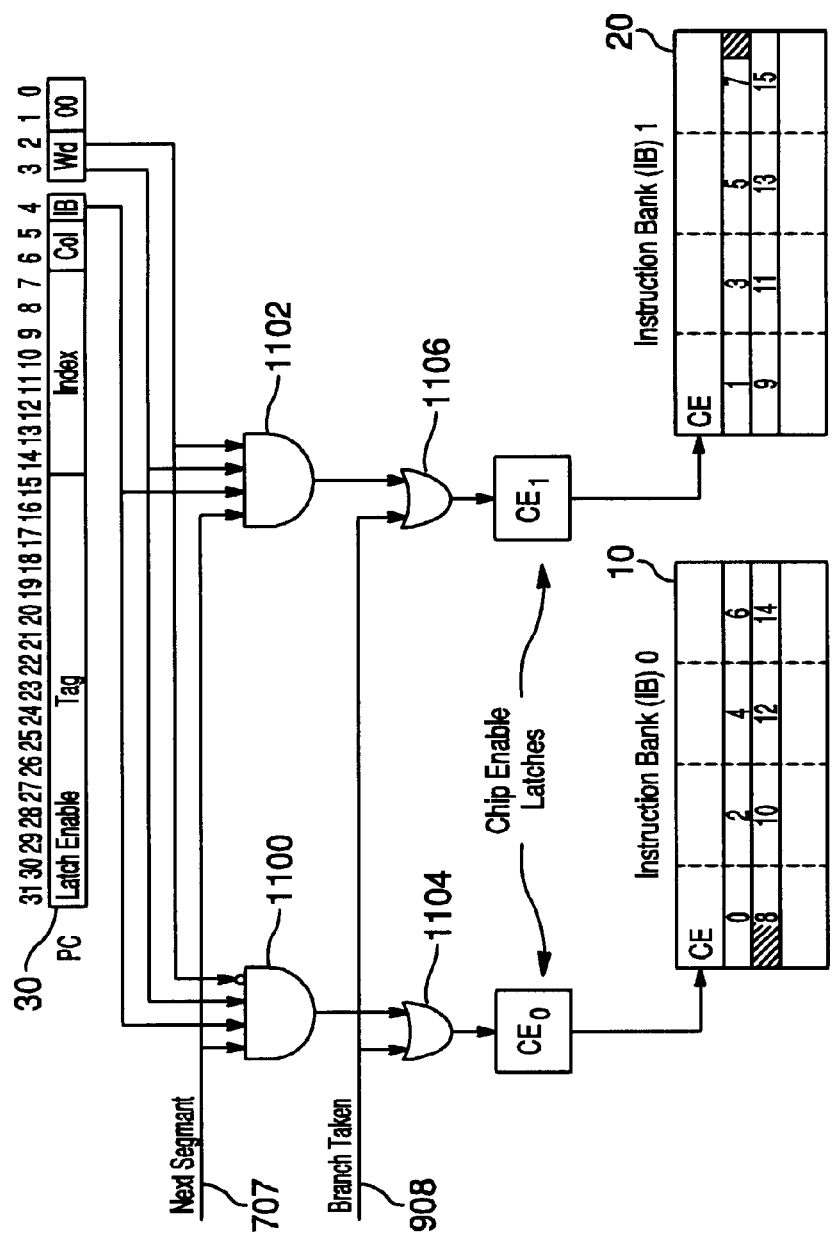
FIG. 11 is a schematic block diagram of logic to implement a power reduction feature of the present invention.

An embodiment for power reduction in accordance with the present invention is illustrated in FIG. 11. The configuration shown in FIG. 11 shows the program counter 30 and the first cache bank 10 and the second cache bank 20. Power reduction logic, comprising the gates 1100, 1102, 1104, and 1106, is provided to enable only the first cache bank if Col and IB fields in the program counter are binary 11 and 0 respectively (further denoted as 11,0) and the Next Segment signal 707 from FIG. 7 is asserted. Likewise, the power reduction logic enables only the second cache bank 20 if the Col and IB fields in the program counter are in the 11,1 state and the Next Segment signal 707 is asserted. This can be seen by noting that the inputs to the two gates 1100 and 1102 include the Next Segment signal 707 and the IB field and the Col field from the program counter 30. The output from the gate 1100 is applied as one input to the OR gate 1104, with the output of the OR gate 1104 enabling the first cache bank 10. Likewise, the output from the gate 1102 is applied as one input to the OR gate 1106, with the output of the gate 1106 applied to enable the second cache bank 20. The power reduction logic ensures that both cache banks 10 and 20 are accessed if a branch is taken by applying the branch taken signal 908 from FIG. 9 as a second input to each of the OR gates 1104 and 1106. Thus, with these keep-cells, cache bank 10 (the even cache bank) is only accessed when the Col and IB fields in the program counter transition from 11,0 to 11,1. Similarly, the second cache bank 20 (the odd cache bank) is only accessed when the Col and IB fields in the program counter transition from 11,1 to 00,0. Note that for other situations, the keep cells cause the RAM output drivers to remain driving the last accessed cache bank.

It should be noted that if the banked tag structure shown in FIG. 3 is utilized, then the tag banks 300 and 302 need only be accessed when a cache line transition occurs. The first cache bank 10 (the even cache bank) chip enable is asserted when this occurs and can be used for this purpose.

The present invention comprises an instruction cache implementation that allows variable length bundles to cross cache line boundaries. This implementation is accomplished by partitioning the cache line into aligned segments, of size equal to the maximum issue width or greater. These segments are distributed between two cache instruction banks; one cache bank holding the even segments, the other cache bank holding the odd segments. By using this distribution, all segments that contain syllables to the current bundle can be accessed in the same cycle, independent of the bundle alignment. A further embodiment discloses that associated tags for adjacent lines may be stored in separate tag banks and accessed and compared in the same cycle. In addition, an implementation embodiment is disclosed that supports multiple clusters, with the implementation being shown to have similar cycle times for the various extensions. Finally, logic is provided for next PC generation, branching, and power reduction. These paths generally contain the critical path and embodiments are shown that are both scalable and have reasonable cycle time.

Table 6 presents the estimated timing for a 32 KB instruction cache, with a 32 word line and four 32-bit syllable issue width per cluster. Results are based on a two input AND gate equivalent delay and are shown for 1, 2, and 4 clusters. Also shown is tag access-compare timing, which is independent of issue width. Descriptions of five paths are listed below. Note that the tag and instruction bank access time include index decoding, rotate by 1 and array access. For purposes of Table 6, the following definitions should be used:

Tag: Time to compute a cache hit using the banked tag approach. Included is tag bank access time, compare, and hit signal generation. The replicated tag approach would eliminate one gate delay and $t_{TB}=t_{IB}$. The value of $t_{IB}$ would likely increase.

Clu: Time to extract each clusters syllables. Included is instruction bank access time, column select, bundle extraction, and cluster syllable extraction.

PC: Time to generate the next PC, including latching $Wd_0$ and $Wd_1$. Included is instruction bank access time, column select, start bit masking, start bit priority encode (i.e., next Wd field generation), and propagation delay through the PC branch multiplexer. Latching Wd, instead of $Wd_0$ and $Wd_1$, would add four gate delays.

Br: Time to perform first cycle of branch instruction. Included is instruction bank access time, column select, and branch instruction extraction. Branch decode, condition access, and target addresses generation are performed in the second cycle, resulting in one branch delay slot for any number of clusters.

Pw: Time including power reduction circuitry to generate bank chip enables. Included is instruction bank access time, start bits masking, Next Segment signal generation, and next cycle chip enable generation.

Note that the key result of Table 6 is that the timing stays approximately equal for all clusterings (i.e., issue width equal to 4, 8, and 16). This approximate equality is the result of offsetting effects; some circuitry increasing levels of gates with additional clusters, and other circuitry and logic decreasing the levels of gates. The results is a scalable solution that allows variable length instructions to cross cache line boundaries without an increase in die area or cycle time.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

TABLE 1

| | | Select Logic | | | |
|---|---|---|---|---|---|
| IB | Word | Sel 0 | Sel 1 | Sel 2 | Sel 3 |
| 0 | 00 | 0 | 0 | 0 | 0 |
| 0 | 01 | 1 | 0 | 0 | 0 |
| 0 | 10 | 1 | 1 | 0 | 0 |
| 0 | 11 | 1 | 1 | 1 | 0 |
| 1 | 00 | 1 | 1 | 1 | 1 |
| 1 | 01 | 0 | 1 | 1 | 1 |
| 1 | 10 | 0 | 0 | 1 | 1 |
| 1 | 11 | 0 | 0 | 0 | 1 |

TABLE 2

Mask Signals (1=Mask,0=Pass) of Gates 324, AND Gate, 326, and 328 of FIG. 3

| | | {Col,IB} | | | | | | | |
|---|---|---|---|---|---|---|---|---|---|
| | | 00,0 | 00,1 | 01,0 | 01,1 | 10,0 | 10,1 | 11,0 | 11,1 |
| {TB, Wd} | 0,00 | 0,1 | 0,1 | 0,1 | 0,1 | 0,1 | 0,1 | 0,1 | 0,1 |
| | 0,01 | 0,1 | 0,1 | 0,1 | 0,1 | 0,1 | 0,1 | 0,1 | 0,0 |
| | 0,10 | 0,1 | 0,1 | 0,1 | 0,1 | 0,1 | 0,1 | 0,1 | 0,0 |
| | 0,11 | 0,1 | 0,1 | 0,1 | 0,1 | 0,1 | 0,1 | 0,1 | 0,0 |
| | 1,00 | 1,0 | 1,0 | 1,0 | 1,0 | 1,0 | 1,0 | 1,0 | 1,0 |
| | 1,01 | 1,0 | 1,0 | 1,0 | 1,0 | 1,0 | 1,0 | 1,0 | 0,0 |
| | 1,10 | 1,0 | 1,0 | 1,0 | 1,0 | 1,0 | 1,0 | 1,0 | 0,0 |
| | 1,11 | 1,0 | 1,0 | 1,0 | 1,0 | 1,0 | 1,0 | 1,0 | 0,0 |

TABLE 3

| | Cluster Select Logic | | | |
|---|---|---|---|---|
| Word | Sel 0 | Sel 1 | Sel 2 | Sel 3 |
| 000 | 0 | 0 | 0 | 0 |
| 001 | 1 | 0 | 0 | 0 |
| 010 | 1 | 1 | 0 | 0 |
| 011 | 1 | 1 | 1 | 0 |
| 100 | 1 | 1 | 1 | 1 |
| 101 | 0 | 1 | 1 | 1 |
| 110 | 0 | 0 | 1 | 1 |
| 111 | 0 | 0 | 0 | 1 |

TABLE 4

Mask Logic 1

| IB | Wd | M1 | M2 | M3 | M5 | M6 | M7 |
|----|----|----|----|----|----|----|----|
| 0 | 00 | 1 | 1 | 1 | 0 | 0 | 0 |
| 0 | 01 | 0 | 1 | 1 | 0 | 0 | 0 |
| 0 | 10 | 0 | 0 | 1 | 0 | 0 | 0 |
| 0 | 11 | 0 | 0 | 0 | 0 | 0 | 0 |
| 1 | 00 | 0 | 0 | 0 | 1 | 1 | 1 |
| 1 | 01 | 0 | 0 | 0 | 0 | 1 | 1 |
| 1 | 10 | 0 | 0 | 0 | 0 | 0 | 1 |
| 1 | 11 | 0 | 0 | 0 | 0 | 0 | 0 |

TABLE 4

Mask Logic 2

| IB | Wd | M1 | M2 | M3 | M5 | M6 | M7 |
|----|----|----|----|----|----|----|----|
| 0 | 00 | 1 | 1 | 1 | 0 | 0 | 0 |
| 0 | 01 | 0 | 1 | 1 | 0 | 0 | 0 |
| 0 | 10 | 0 | 0 | 1 | 0 | 0 | 0 |
| 0 | 11 | 0 | 0 | 0 | 0 | 0 | 0 |
| 1 | 00 | 1 | 1 | 1 | 1 | 1 | 1 |
| 1 | 01 | 1 | 1 | 1 | 0 | 1 | 1 |
| 1 | 10 | 1 | 1 | 1 | 0 | 0 | 1 |
| 1 | 11 | 1 | 1 | 1 | 0 | 0 | 0 |

TABLE 6

Critical Path Gate Delays[1]

| | | 1 Cluster | | | | 2 Cluster | | | | 4 Cluster | | | |
|---|---|---|---|---|---|---|---|---|---|---|---|---|---|
| # Description | Tag[2] | Clu | PC[3] | Br | Pw | Clu | PC[3] | Br | Pw | Clu | PC[3] | Br | Pw |
| 1. Bank Access | $t_{TB}$ | $t_{IIB}$ | $t_{IIB}$ | $t_{IIB}$ | $t_{IIB}$ | $t_{IIB}$ | $t_{IIB}$ | $t_{IIB}$ | $t_{IIB}$ | $t_{IIB}$ | $t_{IIB}$ | $t_{IIB}$ | $t_{IIB}$ |
| 2. 17 bit Tag Compare | 5 | | | | | | | | | | | | |
| 3. Hit Signal Generation | 2 | | | | | | | | | | | | |
| 4. Column Select Multiplexer | | 3 | 3 | 3 | 3 | 2 | 2 | 2 | 2 | | | | |
| 5. Bundle Extraction Mux | | 2 | | | | 2 | | | | 2 | | | |
| 6. Cluster Mux Select Generation | | | | | | 2 | | | | 3 | | | |
| 7. Cluster Multiplexer | | | | | | 2 | | | | 3 | | | |
| 8. Start Bit Mask | | | 1 | | 1 | | 1 | | 1 | | 1 | | 1 |
| 9. Start Bit Priority Encode | | | 2 | | | | 3 | | | | 4 | | |
| 10. PC Latch Branch Multiplexer | | | 2 | | | | 2 | | | | 2 | | |
| 11. Branch Extract Multiplexer | | | | 3 | | | | 4 | | | | 5 | |
| 12. Generate Next Segment Signal | | | | | 3 | | | | 4 | | | | 5 |
| 13. Generation of CEs for next cycle | | | | | 2 | | | | 2 | | | | 2 |
| Total Gate Delays after Bank Access | 7 | 5 | 8 | 6 | 9 | 8 | 8 | 6 | 9 | 8 | 7 | 5 | 8 |

[1] Values in terms of a 2-input AND gate equivalent delay.
[2] Using banked tag structure. A replicated tag structure would eliminate one gate delay and $t_{TB}=t_{IB}$. The value of $t_{IB}$ would likely increase.
[3] Latching $Wd_0$ and $Wd_1$ in PC. Latching Wd instead of $Wd_0$ and $Wd_1$ would add four gate delays.

What is claimed is:

1. A cache structure, organized in terms of cache lines, for use with variable length bundles of instructions (syllables), comprising:
    a first cache bank that is organized in columns and rows;
    a second cache bank that is organized in columns and rows;
    logic for defining said cache line into a sequence of equal sized segments, and mapping alternate segments in said sequence of segments to the columns in said cache banks such that said first bank holds even segments and said second bank holds odd segments;
    logic for storing bundles across at most a first column in said first cache bank and a sequentially adjacent column in said second cache bank; and
    logic for accessing bundles stored in said first and second cache banks.

2. A cache structure as defined in claim 1, wherein each of said segments is at least the size of a maximum issue width for said cache structure.

3. A cache structure as defined in claim 2, further comprising:
    a first tag bank for storing even cache line tags;
    a second tag bank for storing odd cache line tags;
    tag select logic for accessing a tag from at least one of said first and second tag banks; and
    comparison logic for comparing said accessed tag to tag information from a program counter in order to obtain a validity determination for bundles associated with said accessed tag that were accessed from said first and/or second cache banks.

4. A cache structure as defined in claim 3, wherein said tag select logic comprises:
    first tag select logic for selecting a tag in said first tag bank in accordance with select information from a program counter; and
    second tag select logic for selecting a tag in said second tag bank in accordance with said select information from said program counter.

5. A cache structure as defined in claim 4, wherein one of said first and second tag select logics includes an incrementor to selectively increment the respective information received from said program counter.

6. A cache structure as defined in claim 3, wherein said comparison logic comprises:
    first comparison logic for comparing said tag selected by said first tag select logic to tag information from a program counter and generating an output;
    second comparison logic for comparing said tag selected by said second tag select logic to tag information from said program counter and generating an output; and
    tag validity logic taking inputs from said first comparison logic and said second comparison logic and generating an output indicative of validity of the tags selected by the first and second comparison logics.

7. A cache structure as defined in claim 6, wherein an output from a decoder for one of said first and second tag banks is rotated by one.

8. A cache structure as defined in claim 6, wherein said tag validity logic includes logic to selectively mask an output from one of said comparison logics if said bundle does not cross a cache line boundary.

9. A cache structure as defined in claim 1, wherein said storing logic includes logic for storing said bundles across line boundaries.

10. A cache structure as defined in claim 9, wherein said accessing logic comprises:

a first select logic for selecting a first column in said first cache bank based on first information from a program counter; and a second select logic for selecting a sequentially adjacent column, relative to the column selected in said first cache bank, in said second cache bank based on said first information from said program counter.

11. A cache structure as defined in claim 10, wherein one of said first and second select logics includes an incrementor to selectively increment the first information from said program counter.

12. A cache structure as defined in claim 10, wherein said accessing logic comprises:

third select logic for receiving an input of second information from said program counter; and an bundle extraction multiplexer receiving a segment from each of said first cache bank and said second cache bank and outputting a composite segment formed from one or both of said received segments in accordance with a selector output from said third select logic.

13. A cache structure as defined in claim 12, further comprising:

a cluster extraction multiplexer for receiving a composite segment and extracting cluster syllables.

14. A cache structure as defined in claim 13, wherein said cluster extraction multiplexer includes:

a first cluster multiplexer;

a second cluster multiplexer;

a first cluster select logic receiving cluster select information from said program counter and controlling an output of said first cluster multiplexer in accordance therewith; and a second cluster select logic receiving said cluster select information from said program counter and a cluster fields associated with each syllable received by said second cluster multiplexer and controlling an output of said second cluster multiplexer in accordance therewith.

15. A cache structure as defined in claim 9, wherein an output from a decoder for one of said first and second cache bank is rotated by one.

16. A cache structure as defined in claim 1, further comprising PC logic to determine a next value for the program counter, said PC logic including:

a next bundle logic to determine in which segment a next bundle begins; and a next word address logic to determine the next word address within a segment where the next bundle begins.

17. A cache structure as defined in claim 16, wherein said next bundle logic determines said segment in which the next bundle begins begins based on remaining start bits in a current segment after start bits associated with any previous bundle, a current bundle, and a next segment are masked out.

18. A cache structure as defined in claim 16, wherein said next word address logic determines the next word address by masking out start bits associated with previous bundles to obtain remaining start bits, priority encoding the remaining start bits for each segment, and then selecting a Wd value in the program counter for the next bundle.

19. A cache structure as defined in claim 16, wherein values for $Wd_0$ and $Wd_1$ are latched prior to multiplexing, and are selected using an IB field in said program counter.

20. A cache structure as defined in claim 1, further comprising PC logic to determine a next value of a program counter register in branch situations that includes:

logic to extract a branch instruction from a bundle, determine if the branch is taken, and if taken compute a target address; and if taken, loading logic to load the target address into the program counter register.

21. A cache structure as defined in claim 1, further comprising a power reduction logic to enable only said first cache bank if first information is received from said second program counter, to enable only said second cache bank if second information is received from said program counter, and to always enable both of said cache banks when a branch is taken.

22. A method for organizing a cache structure which, in turn, is organized in terms of cache lines, for use with variable length bundles of instructions (syllables), comprising:

defining said cache line into a sequence of equal sized segments, and mapping alternate segments in said sequence of segments to columns in cache banks such that a first bank holds even segments and a second bank holds odd segments;

storing bundles across at most a first column in said first cache bank and a sequentially adjacent column in said second cache bank; and accessing bundles stored in said first and second cache banks.

23. A program product, comprising:

a computer usable medium having computer readable code embodied therein for organizing a cache structure which, in turn, is organized in terms of cache lines, for use with variable length bundles of instructions (syllables), comprising:

first code for defining said cache line into a sequence of equal sized segments, and mapping alternate segments in said sequence of segments to columns in cache banks such that a first bank holds even segments and a second bank holds odd segments;

second code for storing bundles across at most a first column in said first cache bank and a sequentially adjacent column in said second cache bank; and third code for accessing bundles stored in said first and second cache banks.

* * * * *